United States Patent
Haddy

(10) Patent No.: US 10,460,523 B1
(45) Date of Patent: Oct. 29, 2019

(54) AUGMENTED REALITY SYSTEM FOR ELECTROMAGNETIC BURIED ASSET LOCATION

(71) Applicant: Alan Haddy, Naples, FL (US)

(72) Inventor: Alan Haddy, Naples, FL (US)

(*) Notice: Subject to any disclaimer, the term of this patent is extended or adjusted under 35 U.S.C. 154(b) by 0 days.

(21) Appl. No.: 16/259,437

(22) Filed: Jan. 28, 2019

(51) Int. Cl.
*G01V 3/38* (2006.01)
*G06T 19/00* (2011.01)
*G01V 3/08* (2006.01)

(52) U.S. Cl.
CPC ............ *G06T 19/006* (2013.01); *G01V 3/081* (2013.01); *G01V 3/38* (2013.01)

(58) Field of Classification Search
CPC ............................. G06T 19/006; G01V 3/081
See application file for complete search history.

(56) References Cited

U.S. PATENT DOCUMENTS

| | | | | |
|---|---|---|---|---|
| 5,365,115 | A * | 11/1994 | Kalyon | H02G 7/22 307/89 |
| 9,465,129 | B1 * | 10/2016 | Olsson | G01V 3/38 |
| 2004/0178794 | A1 * | 9/2004 | Nelson | G01V 3/104 324/323 |
| 2006/0036376 | A1 * | 2/2006 | Gudmundsson | G01V 3/081 702/38 |
| 2008/0231264 | A1 * | 9/2008 | Krueger | G01D 5/2073 324/207.22 |
| 2011/0004450 | A1 * | 1/2011 | Mishelevich | A61N 2/006 703/2 |
| 2011/0153215 | A1 * | 6/2011 | Yoon | G06Q 10/06 702/5 |
| 2011/0273559 | A1 * | 11/2011 | Yagitani | G01R 29/0871 348/135 |
| 2012/0127161 | A1 * | 5/2012 | Wallbom | G06T 17/05 345/419 |
| 2012/0147153 | A1 * | 6/2012 | Lin | G01R 29/0892 348/51 |
| 2013/0006593 | A1 * | 1/2013 | Uehara | G01R 33/0064 703/2 |
| 2013/0084838 | A1 * | 4/2013 | Smith | G01C 15/00 455/414.2 |
| 2013/0245990 | A1 * | 9/2013 | Merewether | G01V 3/08 702/150 |
| 2014/0200863 | A1 * | 7/2014 | Kamat | G01C 15/00 703/1 |

(Continued)

*Primary Examiner* — Jitesh Patel
(74) *Attorney, Agent, or Firm* — Mark Terry

(57) ABSTRACT

A system for calculating and visualizing a position of buried assets during a buried asset locate procedure in a target area includes an electromagnetic locate device (ELD) including electromagnetic antennas configured for sensing an electromagnetic (EM) field emanating from a buried asset at a target area, and an augmented reality system comprising a camera, a display, inertial sensors for measuring motion and distance moved, and processors configured for reading camera data and sensor data, calculating motion and distance moved, generating a 3D model representing the target area, generating a 3D vector field representing the EM field emanating from the buried asset, calculating a position of the buried asset based on the 3D vector field and the 3D model, creating an object in the 3D model that represents the buried asset, and rendering video of the target area including a graphic representation of the position of the buried asset.

22 Claims, 12 Drawing Sheets

(56) References Cited

U.S. PATENT DOCUMENTS

| | | | |
|---|---|---|---|
| 2014/0210856 A1* | 7/2014 | Finn | G01C 15/002 |
| | | | 345/633 |
| 2017/0046877 A1* | 2/2017 | Hustad | G06F 3/147 |
| 2017/0160420 A1* | 6/2017 | Olsson | G01V 3/12 |
| 2017/0307670 A1* | 10/2017 | Olsson | G01R 29/085 |

* cited by examiner

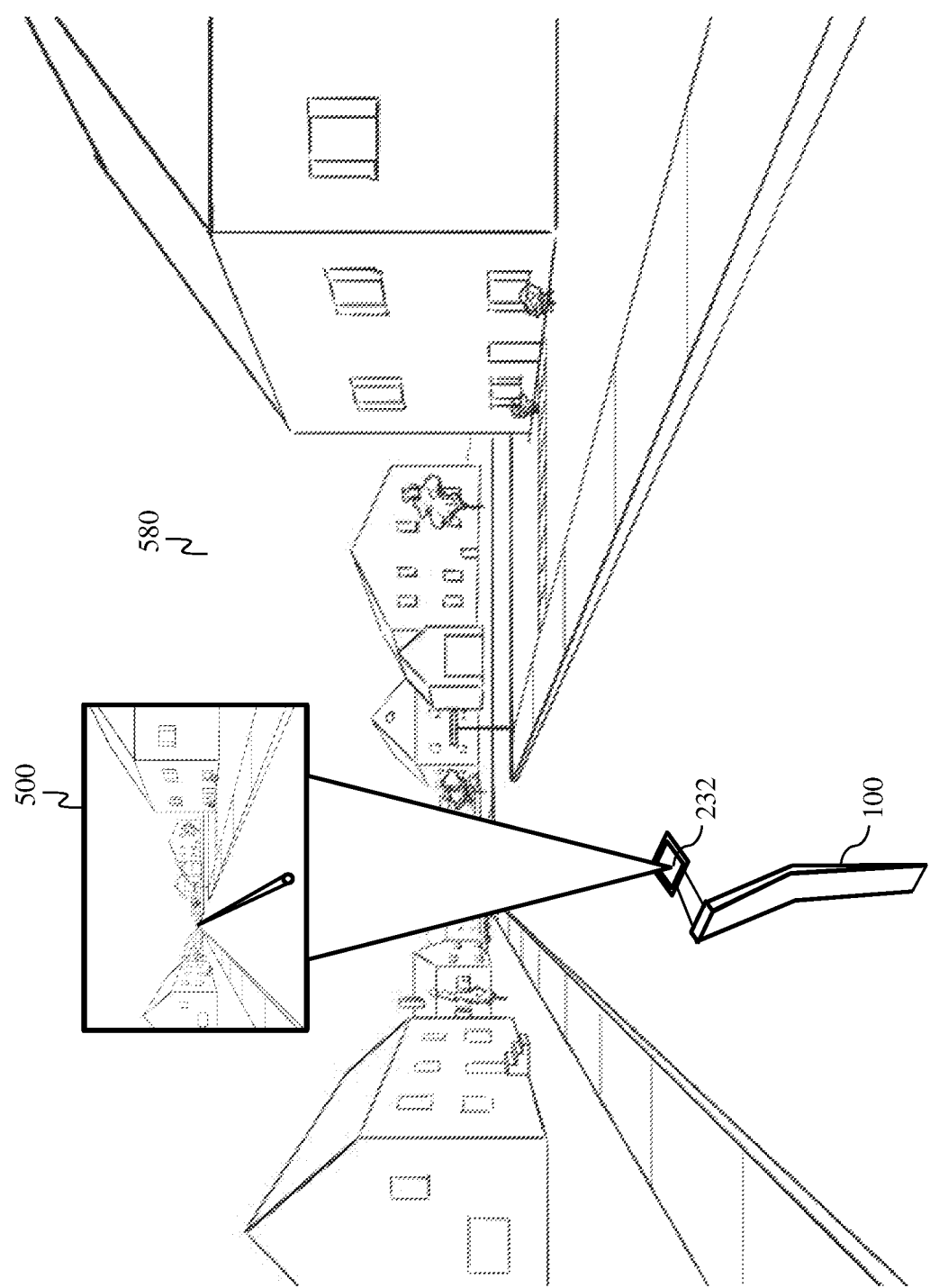

AUGMENTED REALITY SYSTEM FOR ELECTROMAGNETIC BURIED ASSET LOCATION

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to the detection and identification of buried assets (i.e., underground utility lines) and, more specifically, to pinpointing and visualizing buried assets during a buried asset locate procedure.

BACKGROUND

Utility lines, such as lines for telephones, electricity distribution, natural gas, cable television, fiber optics, Internet, traffic lights, street lights, storm drains, water mains, and wastewater pipes, are often located underground. Said utility lines described above are referred to as "buried assets" herein. Consequently, before excavation occurs in an area, especially an urban area, an excavator is typically required to clear excavation activities with the proper authorities and service providers. The clearance procedure usually requires that the excavator contact a central authority (such as "One Call", "811" and "Call Before You Dig," which are well known in the art) which, in turn, sends a notification to the appropriate utility companies. Subsequently, each utility company must perform a buried asset detection procedure, which includes having a field technician visit the proposed excavation site, detecting the relevant buried assets and physically marking the position of the buried asset using temporary paint or flags. The device used for marking the ground with paint is referred to as a handheld paint marking device, a paint stick or a handheld marker wand.

Usually, a field technician visiting a proposed excavation site utilizes a portable electronic device known as a pipe or cable locator, an electromagnetic locate device ("ELD"), an electromagnetic locator, a buried asset locate device, or a buried asset locator (collectively referred to herein as an "ELD"). Said ELDs are commercial, off-the-shelf, devices employed to detect and identify the position of buried assets. ELDs are usually used in conjunction with a transmitter, so as to create an electromagnetic field that can be detected by the ELD. The ELD typically contains multiple ferrite or air cored antennae, arranged at various geometries to the target pipe or cable, that detect the low-level signals radiating from the target conductor. The operator performs certain physical motions with the ELD such as sweeping across the assumed target path, rotating and lifting, all while the ELD must be orientated correctly to the plane of the buried asset to ensure correct geometric alignment with the radiated electromagnetic field. The field technician must then interpret and deduce from the displayed ELD information the location and position of the buried conductor. The process of detecting and marking out a buried asset using an ELD is referred to herein as a buried asset locate procedure, buried asset location procedure, or a buried asset detection procedure.

The aforementioned buried asset location procedure, however, takes time and training to master. There are a variety of techniques that the field technician must learn in order to perform buried asset location procedures in a way that meets best practice standards. Often, the field technician may spend a significant amount of time at a training facility learning proper techniques and then perform an apprenticeship afterwards. Even after completing the aforementioned training and apprenticeship, buried asset location procedures can be difficult and tedious to perform, especially in commonly occurring complex environments, that include multiple buried assets, which can cause signal interference and field distortion that can easily confuse the technician, leading to the incorrect identification, location and marking of the target asset's position. Resulting damages to the target or $3^{rd}$ party buried assets during excavation are costly and hazardous to human life.

Additionally, the performance of conventional ELDs is limited by the number of, geometry and distance between the electromagnetic antennas located in the ELD for sensing electromagnetic fields. Said distance between antennas limits the depth at which the buried asset can be detected.

The difficulties and the dependence on human interpretation of data associated with performing buried asset located procedures are compounded by the fact that, technologically, conventional ELDs have not developed much in the last 30 years. As a result, the technology within most conventional ELDs on the market and in the field is, for the most part, antiquated. Consequently, conventional ELDs are not currently benefiting from the technological advancements that are currently available.

Therefore, a need exists for improvements over the prior art, and more particularly for more safe, efficient methods and systems for performing buried asset locate procedures.

SUMMARY

A system for calculating and visualizing a position of buried assets during a buried asset locate procedure in a target area is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, the system for calculating and visualizing a position of buried assets during a buried asset locate procedure in a target area includes an electromagnetic locate device (ELD) including one or more electromagnetic antennas configured for sensing an electromagnetic (EM) field emanating from a buried asset at a target area, wherein each electromagnetic antenna produces vector field data at each periodic point in space, and an augmented reality system comprising a camera, a display, inertial sensors for measuring motion and distance moved, and one or more processors configured for: a) reading camera data from the camera of a target area in which the system is situated, and reading sensor data from the inertial sensors; b) calculating motion of the electromagnetic antennas and distance moved by the electromagnetic antennas based on the sensor data and the camera data, c) generating a 3D model representing the electromagnetic antennas and the target area in which the system is situated, based on the camera data, and the motion and distance moved that was calculated, d) calculating vector field values for the EM field at multiple different points in space based on the vector field data from the electromagnetic antennas, e) placing each vector field value that was calculated in the 3D model representing the electromagnetic antennas and the target area in which the system is situated, based on the camera data, and the motion and distance moved that was calculated, thereby generating a 3D vector field representing the EM field emanating from the buried asset, f) calculating a position of the buried asset based on the 3D vector field and the 3D model, and creating an object in the 3D model that represents the position of the buried asset, and g) rendering video of the target area in the display, and overlaying onto said video a graphic representation of the position of the buried asset, based on the 3D model.

BRIEF DESCRIPTION OF THE DRAWINGS

The accompanying drawings, which are incorporated in and constitute a part of this disclosure, illustrate various example embodiments. In the drawings:

FIG. 5C is an illustration of a closeup of a video display of the system for visualizing buried assets during a buried asset locate procedure, according to an example embodiment;

DETAILED DESCRIPTION

Figure 1A:
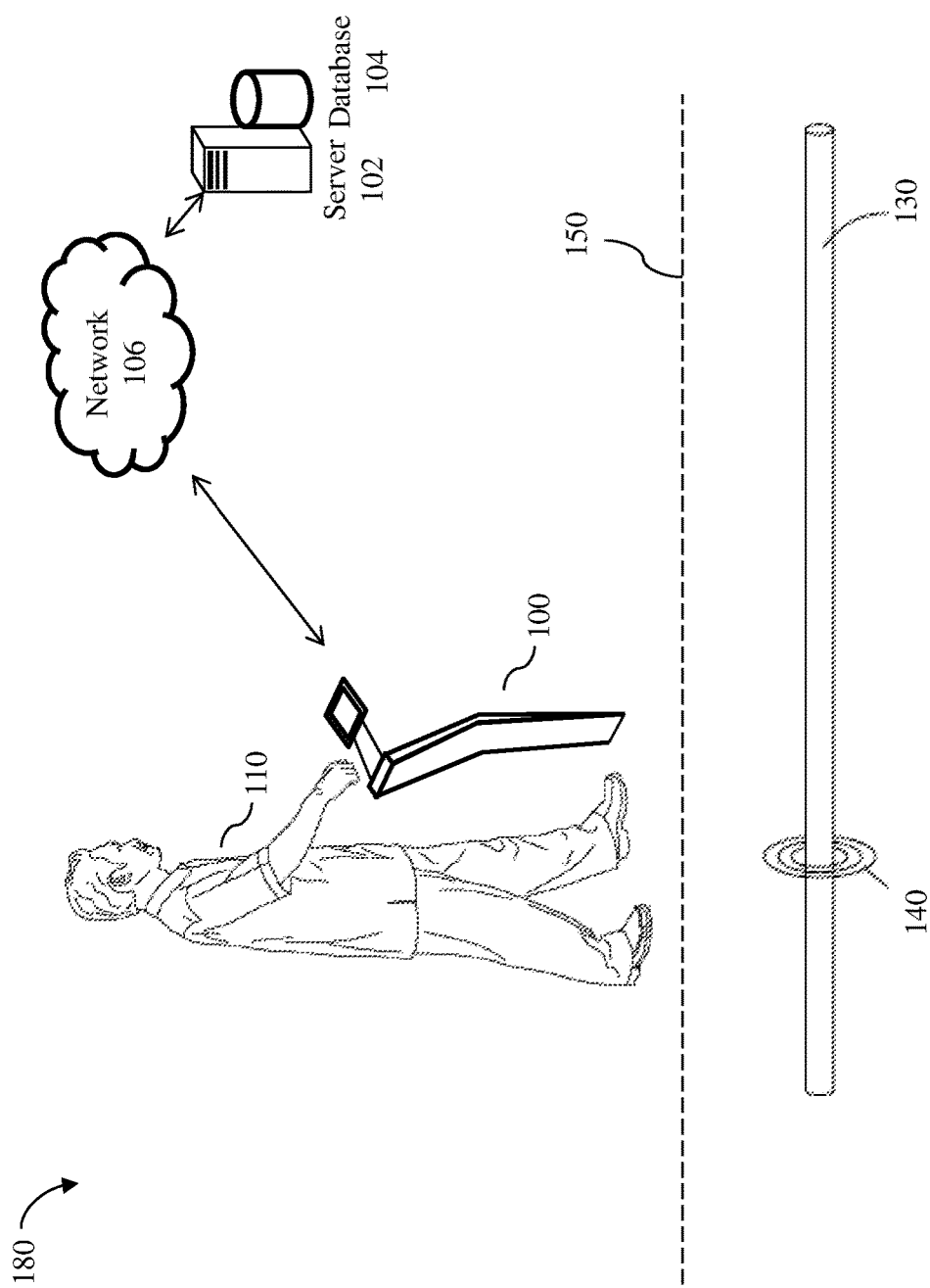
FIG. 1A is an illustration of an operating environment that supports a system for visualizing buried assets during a buried asset locate procedure, according to an example embodiment.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed subject matter improves over the prior art by providing a system and method for mapping and visualizing a buried asset during a buried asset locate procedure. The claimed subject matter improves over the prior art by providing an improved buried asset locator device that uses a virtual array of electromagnetic sensors to model the electromagnetic field of a buried asset using a single electromagnetic sensor set and the fusion of augmented reality that provides a spatial and visual reference of the position of the target buried asset. The claimed subject matter utilizes a model of the electromagnetic field of the target buried asset to display for the technician a real-world representation of the buried asset in a screen, overlaid onto a video of the physical landscape of the real world.

The claimed subject matter also provides a safer, more efficient, automated and precise way of measuring and interpreting the electromagnetic field of a buried asset, using a single electromagnetic sensor set, during a buried asset locate procedure. The example embodiments leverage the vast amount of data that can be collected by a single electromagnetic sensor set during a buried asset locate procedure to create an internal representation of the electromagnetic field produced by a buried asset. This allows the system to produce a visualization of the buried asset in the physical landscape of the real world. The disclosed embodiments reduce or eliminate the complexities associated with buried asset locate procedures by assisting the technician is detecting the buried asset being sought. Hence, the example embodiments provide a complete picture of an asset buried underground to a field technician during a buried asset locate procedure, which increases quality control and quality assurance.

For the purposes of this document, augmented reality (AR) is defined as an interactive experience of a real-world environment where the objects that reside in the real-world are augmented by computer-generated perceptual information, such as overlaid visual data. In the disclosed embodiments, the overlaid visual data comprises graphics that represent buried assets in such a way that the visual data is seamlessly interwoven with video of the actual ground in the physical world. In this way, the disclosed embodiments alter the technician's ongoing perception of the real world ground, such that he can also perceive the location and orientation of buried assets under the ground.

FIG. 1A is a diagram of an operating environment 180 that supports a method and system for visualizing buried assets during a buried asset locate procedure. FIG. 1A also shows a system 100 that includes, among other things explained in detail below, an electromagnetic locator device ("ELD") which detects and measures radio frequency and/or electromagnetic (EM) signals 140 emanating from a buried asset 130, and which performs augmented reality processes. In one embodiment, system 100 includes all of the functions of a conventional ELD, which is well known in the art. System 100 may also be connected either wirelessly or in a wired or fiber optic form to a communications network 106 such as the cellular network, the Internet or the World Wide Web. System 100 may comprise one or more computing device 600, described below in greater detail with respect to FIG. 6. In one embodiment, a conventional ELD is defined as a handheld cable locator well known in the art, wherein the cable locator includes a series of antennas that take electromagnetic readings emanating from a buried asset, and wherein the cable locator processes said readings, and then displays information about said readings on a display for a technician to view. The environment 180 shows that system 100 is operated by a technician or operator 110 (i.e., a field technician).

In another embodiment, the system 100 also calculates current geographical position (otherwise referred to as geographical location data) using an on-board processor or a connected processor. In one embodiment, system 100 may calculate current position using a satellite or ground based positioning system, such as a Global Positioning System (GPS) system, which is a navigation device that receives satellite or land-based signals for the purpose of determining the device's current geographical position on Earth. Generally, system 100 calculates global navigation satellite system (GNSS) data. A GNSS or GPS receiver, and its accompanying processor, may calculate latitude, longitude and altitude information. In this document, the terms GNSS and GPS are used generally to refer to any global navigation satellite system, such as GLONASS, GALILEO, GPS, etc. In this embodiment, a radio frequency signal is received from a satellite or ground based transmitter comprising a time the signal was transmitted and a position of the transmitter. Subsequently, system 100 calculates current geographical location data of the device based on the signal. In another embodiment, system 100 calculates current geographical location using alternative services, such as control plan locating, GSM localization, dead reckoning, or any combination of the aforementioned position services. The term spatial technologies or spatial processes refers generally to any processes and systems for determining one's position using radio signals received from various sources, including satellite sources, land-based sources and the like.

System 100 may include a software engine that delivers applications, data, program code and other information to networked devices. The software engine of system 100 may perform other processes such as transferring multimedia data in a stream of packets that are interpreted and rendered by a software application as the packets arrive. System 100 may include a database or repository, which may be a relational database comprising a Structured Query Language (SQL) database stored in a SQL server. System 100 may include its own database, either locally or via the cloud.

System 100 or its subcomponents may each include program logic comprising computer source code, scripting language code or interpreted language code that perform various functions of the disclosed embodiments. In one embodiment, the aforementioned program logic may comprise program module 607 in FIG. 6. It should be noted that although FIG. 1A shows only one device 100, the system of the disclosed embodiments supports any number of devices 100. Also note that although device 100 is shown as a single and independent entity, in one embodiment, device 100 and its functionality can be realized in a centralized fashion in one computer system or in a distributed fashion wherein different elements are spread across several interconnected computer systems.

Environment 180 may be used when system 100 engages in buried asset detection activities that comprise reading, generating, and storing buried asset related data. Various types of data may be generated and stored with relation to a buried asset that has been detected and located. For example, one or more records may be stored for each buried asset, and each record may include one or more buried asset data points. A buried asset data point may include a current time, a textual map address, and location data or position data, such as latitude and longitude coordinates, geographical coordinates, an altitude coordinate, or the like. A buried asset data point may also include depth measurement data, electromagnetic signal measurement data (such as electrical current measurement data, resistance measurement data, impedance measurement data, electrical signal magnitude measurement data, electrical signal frequency measurement data, electrical signal voltage measurement data, etc.), direction data and orientation data. Each record may include data for one buried asset data point.

A buried asset data point may also include a precision data value corresponding to any piece of information associated with a buried asset data point, such as the geographical coordinate or. A precision data value is a value that represents the quality or level of precision of a piece of information, such as a geographical coordinate. All sensors and devices that read physical quantities have a certain amount of measurement error or observational error. A precision data value represents the amount or magnitude of the measurement error or observational error of a sensor or device at one time. In one embodiment, a precision data value is a numerical value, such as a real number from 0 to 1.0 (with a variable number of decimal points) wherein zero represents perfect precision, 0.5 represents a precision that is 50% off from a true value, 0.75 represents a precision that is 75% off from a true value, etc. In another embodiment, a precision data value is an alphanumeric value (such as a word or other ASCII string) that corresponds (according to a lookup table or other correspondence table) to a predefined amount of precision. In another embodiment, a precision data value is any set of values that may be sorted according to ascending or descending value. Thus, in this embodiment, precision data values may have ascending and descending values.

In one embodiment, the precision data value is inversely proportional to the level of precision of quality of a piece of information, such as a geographical coordinate. Thus, when there is a large margin of error or a low confidence level in a piece of information, then the precision data value is high and the quality or level of precision of the information is low. Conversely, when there is a small margin of error or a high confidence level in a piece of information, then the precision data value is low and the quality or level of precision of the information is high.

With regard to geographical coordinates, HDOP, VDOP, PDOP, and TDOP values (Horizontal, Vertical, Positional and Time Dilution of Precision, respectively) are precision data values well known in the art for representing the quality or level of precision of a geographical coordinate. Also, with regard to geographical coordinates, values representing the quality or level of precision of a geographical coordinate may rely on whether a differential correction technique (such as differential GPS) was used in calculating the coordinate. The Differential Global Positioning System (DGPS) is an enhancement to Global Positioning System that provides improved location accuracy. DGPS uses a network of fixed, ground-based reference stations to broadcast the difference between the positions indicated by the satellite systems and the known fixed positions. As such, if DGPS was used to calculate a geographical coordinate, then the precision data value of the coordinate may reflect that fact. For example, the precision data value may indicate higher accuracy if DGPS was used.

In one embodiment, Precise Point Positioning (PPP) is used to generate a precision data value representing the quality or level of precision of a geographical coordinate. PPP is a global navigation satellite system positioning method to calculate precise positions up to few centimeter level using a single receiver in a dynamic and global reference framework. The PPP method combines precise clocks and orbits calculated from a global network to calculate a precise position with a single receiver.

A buried asset data point may also include a precision data value corresponding to any piece of information associated with a buried asset data point, such as a current time, a textual map address, depth measurement data, electrical signal measurement data (such as electrical current measurement data, signal strength data, resistance measurement data, impedance measurement data, electrical signal magnitude measurement data, electrical signal frequency measurement data, electrical signal voltage measurement data, electromagnetic vector data, horizontal EM field (peak), vertical EM field (null), etc.), direction data (left or right indicators that direct the technician to the location of the buried asset), orientation data, and location data or position data, such as latitude and longitude coordinates, geographical coordinates, an altitude coordinate, or the like.

Electromagnetic data and electromagnetic field representations may also be generated and stored. The one or more electromagnetic antennas in the ELD of system 100 are configured for producing electromagnetic data responsive to an electromagnetic field 140 emanating from a buried asset 130 under the ground 150. Said electromagnetic data may be stored by system 100. System 100 also includes one or more processors 221 for processing the electromagnetic data and producing electromagnetic vector field values representing the EM field 140 that is produced by the buried asset 130 under the ground 150.

Any data collected, stored or calculated by system 100, such as buried asset data points, may be transmitted to server 102 via network 106 for further processing. Said data transmitted to server 102 via network 106 may be stored in database 104.

The system 100 may also include a global navigation satellite system (GNSS) processor 222 communicatively coupled with the processor 221. The GNSS processor 222 is configured for calculating and transmitting a current global position of the system 100. The processor 222 may be one or more of any of the commercially available chips and modules for the GNSS, including receivers for GPS, GLONASS, Galileo, BeiDou and QZSS. The GNSS processor 222 produces a variety of information well known in the art, namely, a global position value, such as latitude and longitude coordinates.

The system 100 also includes a low-power radio frequency (RF) transmitter/receiver configured for transmitting and receiving data over RF. The RF transmitter/receiver may be one or more of any of the commercially available chipsets and modules for exchanging data over short distances, such as a Bluetooth chipset.

Figure 1B:
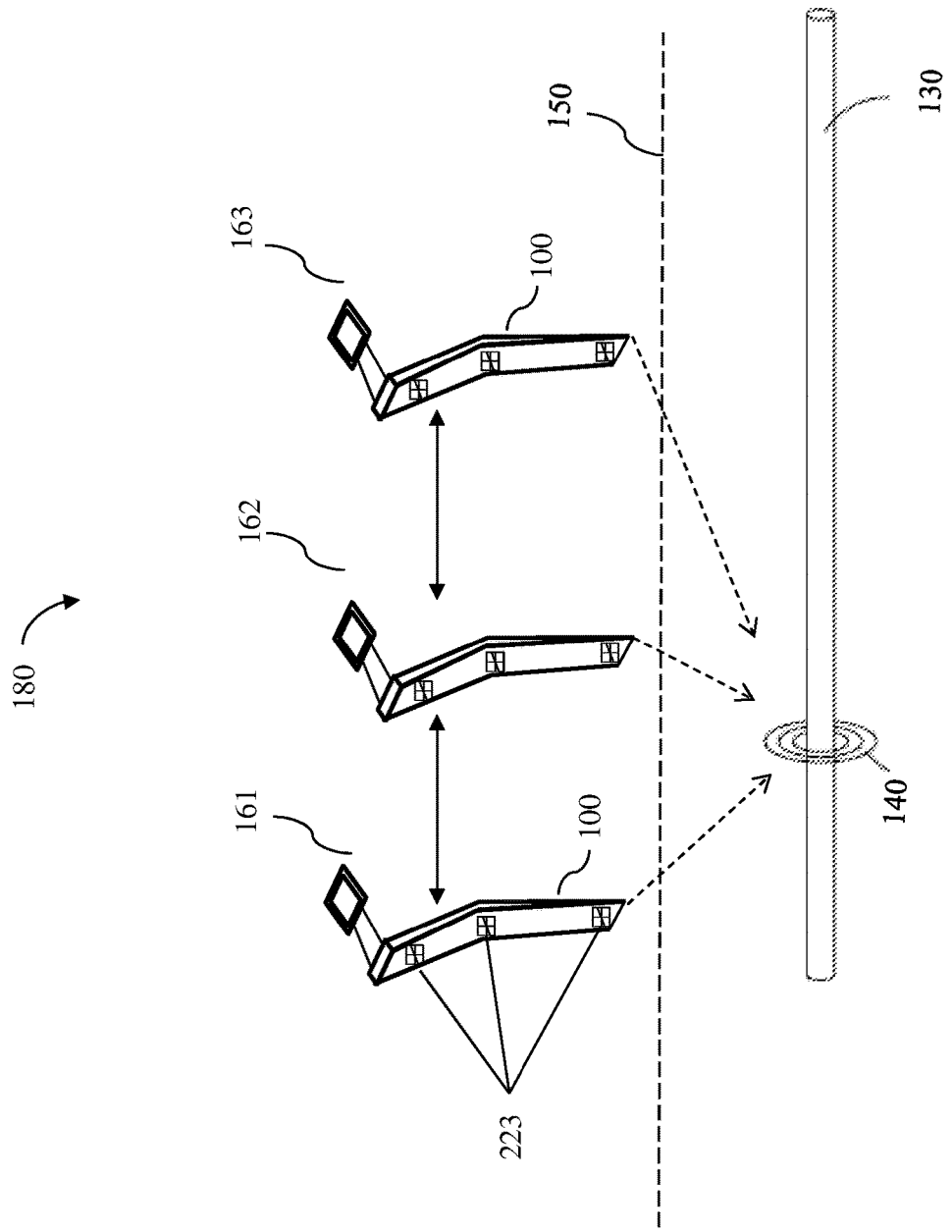
FIG. 1B is an illustration of the system for visualizing buried assets during a buried asset locate procedure, as it moves across space, according to an example embodiment.

FIG. 1B is an illustration of the system 100 for visualizing buried assets during a buried asset locate procedure, as it moves across space, according to an example embodiment. FIG. 1B shows that the electromagnetic sensors or antennas 223 in the ELD 202 of the system 100 sense the EM field 140 emanating from the buried asset 130, wherein each electromagnetic antenna produces vector field data at each periodic point in space. That is, the electromagnetic sensors or antennas 223 produce vector field data at point 161 in space, at point 162 in space and at point 163 in space. Vector field data comprises a value that relates to the strength of the EM field at each point 161, 162, 163 in space, as well as a value that relates to a direction in which the field or the magnetic flux line is pointing at said point in space. Subsequently, processors 221 and/or processors 235 calculate vector field values for the EM field 140 at each point 161, 162, 163 in space based on the vector field data from the electromagnetic antennas. Vector field values comprises a value for the strength of the EM field at said point in space, and a value for the direction in which the field or the magnetic flux line is pointing at said point in space.

Collecting vector field data at multiple points in space allows the system 100 to generate a much higher resolution and far reaching electromagnetic field representation 306. The purpose of said process is to utilize the increased amount of electromagnetic data 304 collected (from electromagnetic sensors 223) while the system 100 is in all three places 161, 162, 163 to generate an electromagnetic field representation 306. By using places 161, 162, 163, the result is that the system 100 is using a virtual array of EM sensors that span the distance between the places 161, 162, 163. The virtual array of EM sensors in said embodiment are the equivalent of nine electromagnetic sensors 223 operating all at once, since all three EM sensor readings are considered at three different locations 161, 162, 163.

This feature of the claimed embodiments addresses the problem with the resolution or capacity of conventional ELDs that are limited by the length between the electromagnetic antennas located in the ELD for sensing electromagnetic fields. Said length between antennas limits the depth at which the buried asset that can be detected and limits how far the device can be from the buried asset, while still performing. For example, most utilities are buried 3 to 6 feet deep and the separation distance between existing ELD sensor sets from about 48" to 16". For deep buried assets (say 25 feet or more) conventional ELDs struggle to produce reliable data. The system 100 eliminates this issue as the single sensor can be moved across a wide area thus creating a virtual antenna array that can locate deep targets. By using places 161, 162, 163, the system 100 is virtually using an array of EM sensors that span the distance between the places 161, 162, 163, thereby increasing the depth at which the buried asset can be detected and increasing how far the device can be from the buried asset, while still performing.

Figure 1C:
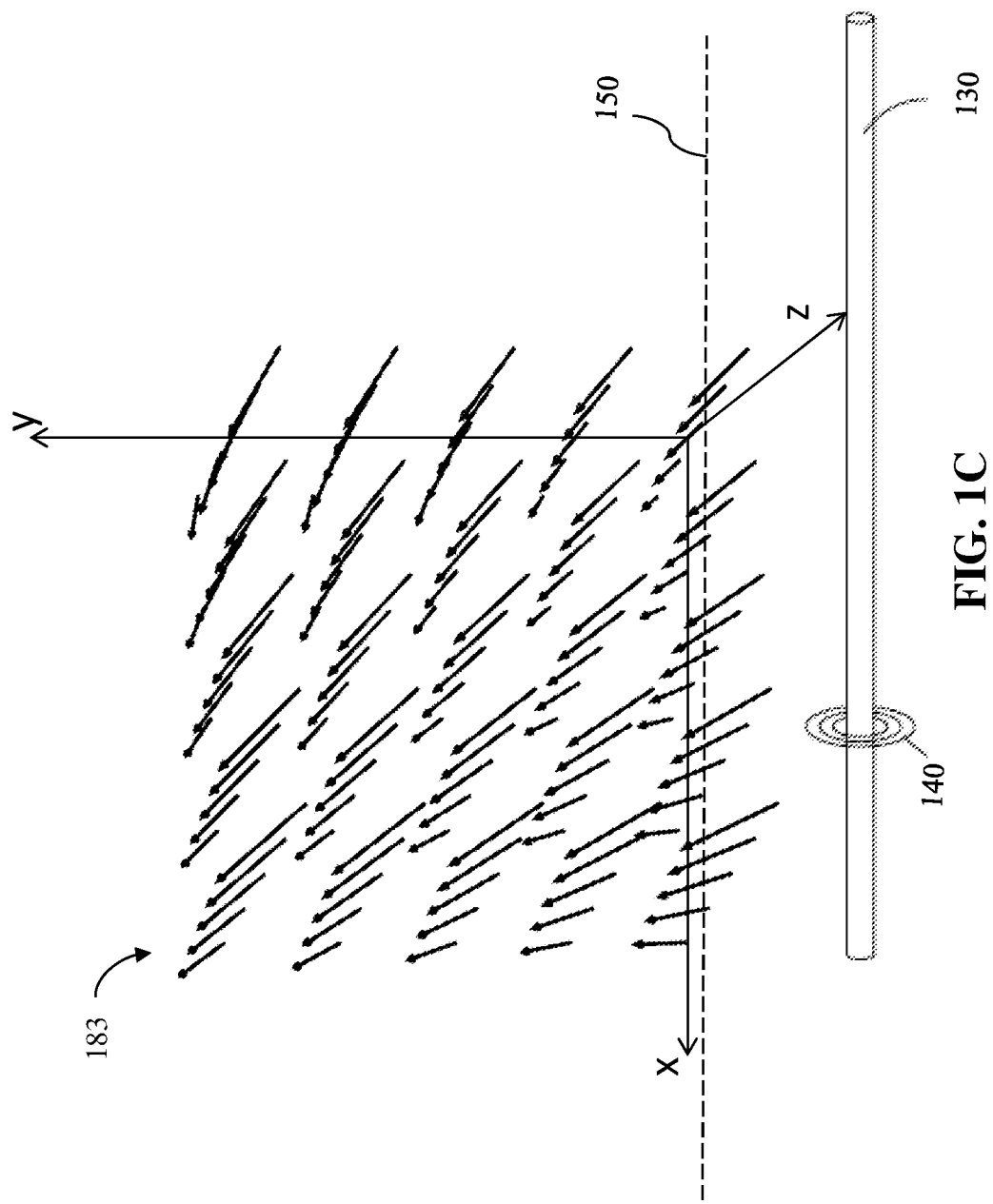
FIG. 1C is an illustration of magnetic vector field values calculated by the system for visualizing buried assets during a buried asset locate procedure, as it moves across space, according to an example embodiment.

FIG. 1C is an illustration of magnetic vector field values calculated by the system 100 for visualizing buried assets during a buried asset locate procedure, as it moves across space, according to an example embodiment. FIG. 1C shows that the electromagnetic sensors or antennas 223 in the ELD 202 of the system 100 sense the EM field 140 emanating from the buried asset 130, wherein each electromagnetic antenna produces vector field data at each periodic point in space. FIG. 1C shows the vector field data 183 that the electromagnetic sensors or antennas 223 produce when moving in space. FIG. 1C shows that each data point in vector field data 183 includes a value for the strength of the EM field at said point in space (depicted by the length of each arrow), and a value for the direction in which the field or the magnetic flux line is pointing at said point in space (depicted by the direction in which each arrow is pointing). FIG. 1C also show that each data point in vector field data 183 is located in a 3D grid depicted by the x, y and z axes for said grid.

Figure 1D:
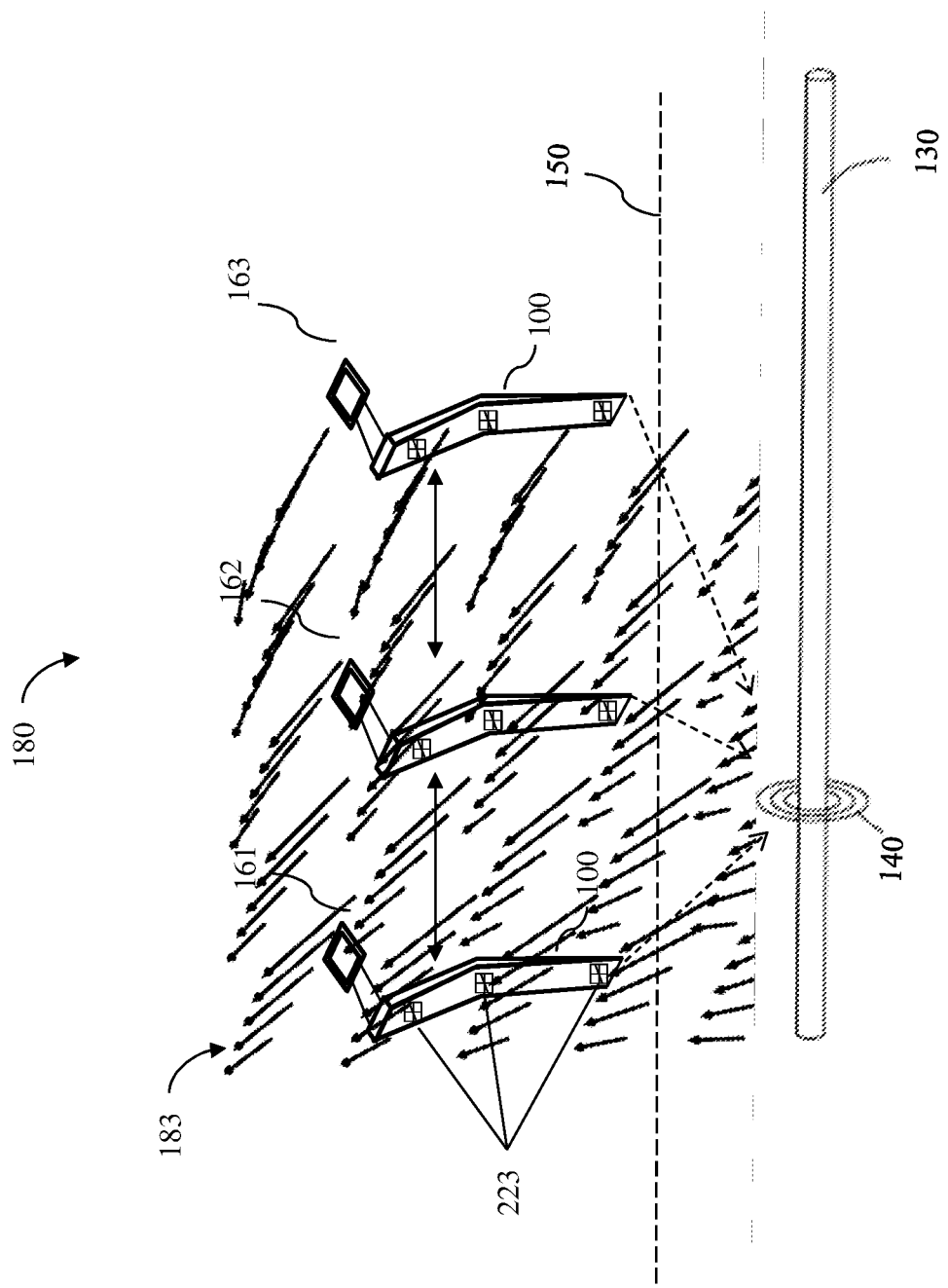
FIG. 1D is an illustration of the system for visualizing buried assets during a buried asset locate procedure, capturing magnetic vector field values as it moves across space, according to an example embodiment.

FIG. 1D is an illustration of the system 100 for visualizing buried assets during a buried asset locate procedure, capturing magnetic vector field values as it moves across space, according to an example embodiment. FIG. 1D shows that the electromagnetic sensors or antennas 223 in the ELD 202 of the system 100 sense the EM field 140 emanating from the buried asset 130 and produce vector field data at each periodic point in space. FIG. 1D shows the vector field data 183 that the electromagnetic sensors or antennas 223 produce when moving in space, wherein each data point in vector field data 183 is located in 3D space. System 100 is able to place each vector field value it calculates in 3D space based on a further process performed by the augmented reality (AR) system 204, described below.

The AR system 204 reads camera data 308 from the camera 231 of a target area in which the system 100 is situated and reads sensor data 309 from the inertial sensors 231. Then the AR system 204 calculates motion of the electromagnetic antennas 223 and distance moved by the electromagnetic antennas 223 based on the sensor data 309 and the camera data 231. The method of calculating motion and distance moved based on camera data and inertial data from inertial sensors is well known in the art, such as the ARKit, available from Apple, Inc. The camera data 308 may be video or still images or both. Next, the AR system 204 generates a 3D model representing the electromagnetic antennas 223 and the target area in which the system 100 is situated, based on the camera data, and the motion and distance moved that was calculated. Then, the AR system 204 calculates vector field values for the EM field at multiple different points in space based on the vector field data from the electromagnetic antennas. Subsequently, the AR system 204 places each vector field value that was calculated in the 3D model representing the electromagnetic antennas and the target area in which the system is situated, based on the camera data, and the motion and distance moved that was calculated, thereby generating a 3D vector field 183 representing the EM field 140 emanating from the buried asset 130. The target area in which the system is situated refers to an area of the ground surface immediately above a buried asset.

Figure 1E:
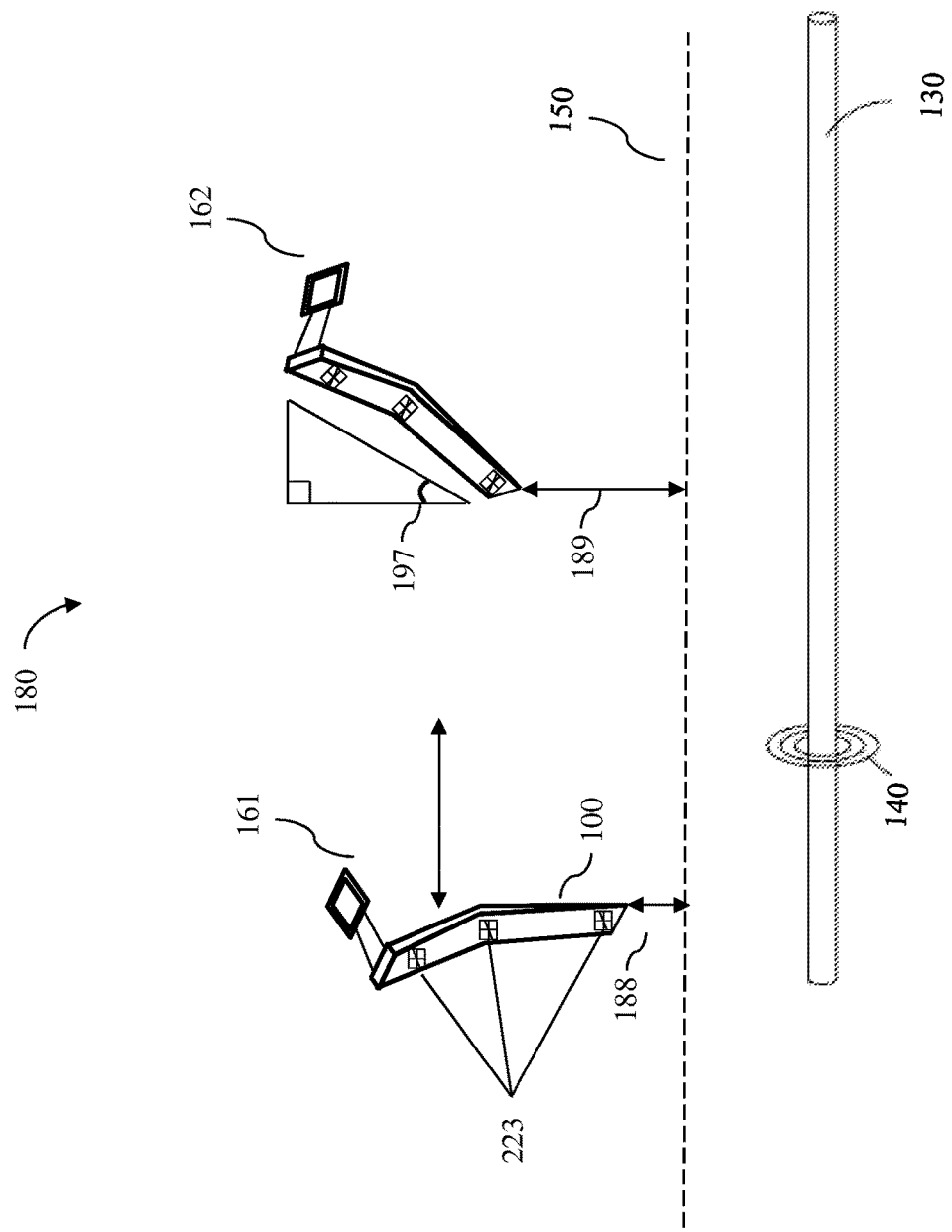
FIG. 1E is an illustration of the system for visualizing buried assets during a buried asset locate procedure, showing the system taking differences in height and orientation into account, according to an example embodiment.

FIG. 1E is an illustration of the system 100 for visualizing buried assets during a buried asset locate procedure, showing the system taking differences in height and orientation into account, according to an example embodiment. Note that changes in height of the system 100 from the ground surface 150, and changes in orientation of the system 100 in relation to the ground surface, will affect how the 3D vector field 183 representing the EM field 140 emanating from the buried asset 130 will be generated. That is, the location of each EM antenna 223 in space (which is affected by height and orientation) defines where each EM vector field value is placed in 3D space. Therefore, the step of calculating motion of the system 100 and distance moved by the system 100 based on the sensor data and the camera data further comprises calculating orientation of the system 100 and height of the system 100 from a ground surface. FIG. 1E shows that the system 100 has increased its height over the ground surface during its movement—whereas the system had height 188 when in location 161, the system then had height 189 when in location 162. FIG. 1E also shows that the system 100 has changed orientation over the ground surface during its movement—whereas the system was substantially upright when in location 161, the system then tilted at angle 197 when in location 162. These changes in height and orientation of the system 100 from location 161 to 162 change how the EM vector field values collated at each location 161, 162 are placed in 3D space. For this reason, the step of calculating motion of the system 100 and distance moved by the system 100 based on the sensor data and the camera data further takes orientation of the system 100 and height of the system 100 into account.

Figure 2:
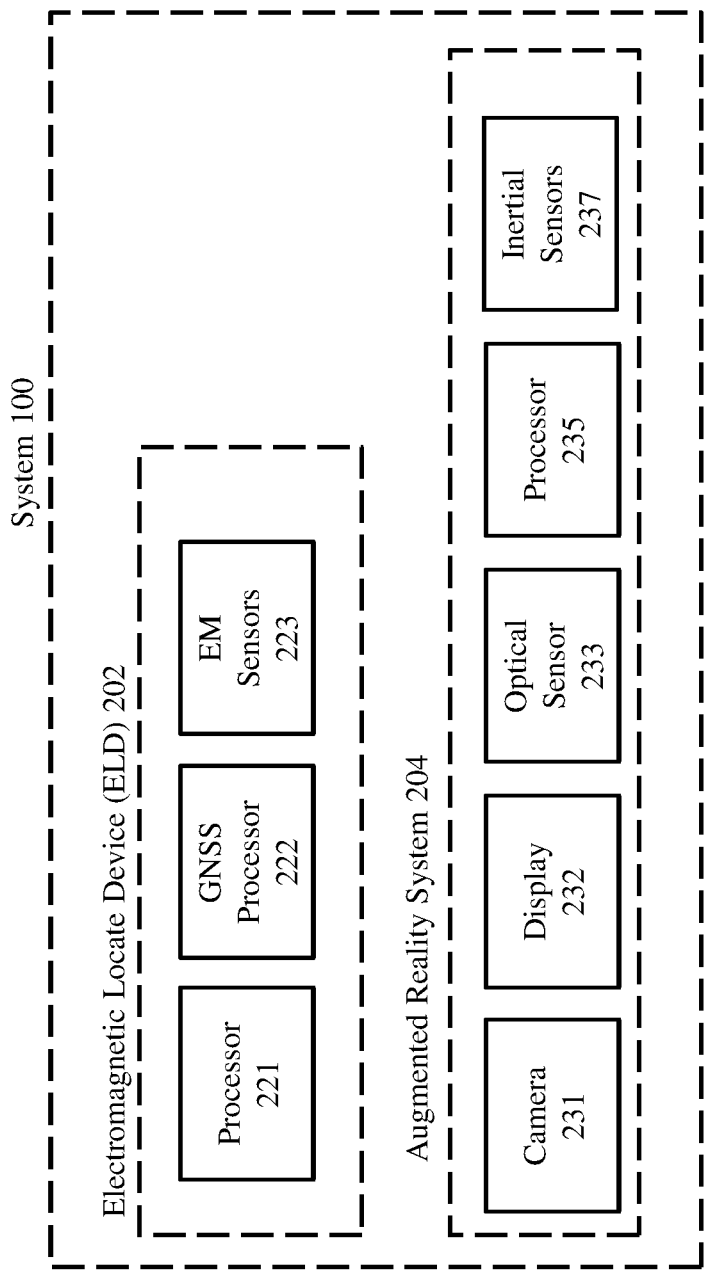
FIG. 2 is an illustration of a block diagram showing the main components of the system for visualizing buried assets during a buried asset locate procedure, according to an example embodiment.

FIG. 2 is an illustration of a block diagram showing the main components of the system 100 for visualizing buried assets during a buried asset locate procedure, according to an example embodiment. FIG. 2 shows that the system 100 includes a conventional ELD 202 that may include one or more electromagnetic antennas or sensors 223 configured for producing electromagnetic data (or vector field data) responsive to an electromagnetic field 140 emanating from a buried asset 130. ELD 202 also includes one or more processors 221 for calculating EM vector field values based on the electromagnetic data or vector field data that was collected. The ELD 202 may also include a global navigation satellite system (GNSS) processor 222 communicatively coupled with the processor 221. The GNSS processor 222 is configured for calculating and transmitting a current global position of the system 100.

FIG. 2 also shows that the system 100 includes an augmented reality system 204 that comprises a camera 231, a display 232 and an optical sensor 233. The camera 231 can be any commercially available optical camera that has the ability to capture photographs (i.e., still images) and/or video of the environment surrounding the system 100, such as the landscape 580 in which the system 100 is operating. The display 232 can be any commercially available display that has the ability to display photographs and/or video of the environment surrounding the system 100, such as the landscape 580 in which the system 100 is operating, in addition to graphical representations of the buried assets 130 in the area. The optical sensor 233 may be any commercially available optical camera or charged coupling device that has the ability to capture photographs and/or video of paint or other colored indicators placed on the ground by the handheld paint marking device, paint stick or handheld marker wand, in the environment surrounding the system 100, such as the landscape 580. Specifically, optical sensor 233 must be able to capture the color of said paint or other colored indicators placed on the ground. This is because the color of said paint or other colored indicators placed on the ground corresponds to the type of buried asset, such as a data line, a sewer line, a power line, etc.

The augmented reality system 204 is communicably coupled with the camera 231, the optical sensor 232, the ELD 202, and the display 232. The augmented reality system 204 may further include one or more processors 235 configured for: a) reading camera data from the camera of a target area in which the system is situated, and reading sensor data from the inertial sensors; b) calculating motion of the electromagnetic antennas and distance moved by the electromagnetic antennas based on the sensor data and the camera data, c) generating a 3D model representing the electromagnetic antennas and the target area in which the system is situated, based on the camera data, and the motion and distance moved that was calculated, d) calculating vector field values for the EM field at multiple different points in space based on the vector field data from the electromagnetic antennas, e) placing each vector field value that was calculated in the 3D model representing the electromagnetic antennas and the target area in which the system is situated, based on the camera data, and the motion and distance moved that was calculated, thereby generating a 3D vector field representing the EM field emanating from the buried asset, f) calculating a position of the buried asset based on the 3D vector field and the 3D model, and creating an object in the 3D model that represents the position of the buried asset, and g) rendering video of the target area in the display, and overlaying onto said video a graphic representation of the position of the buried asset, based on the 3D model. The graphic representation may be a cylindrical graphic, a line graphic or a cubic graphic. The augmented reality system may further comprise inertial sensors 237 such as an accelerometer and a gyroscope for detecting movement and acceleration of the system. The inertial sensors 237 produce sensor data 309 regarding movement and acceleration of the system 100.

Figure 3:
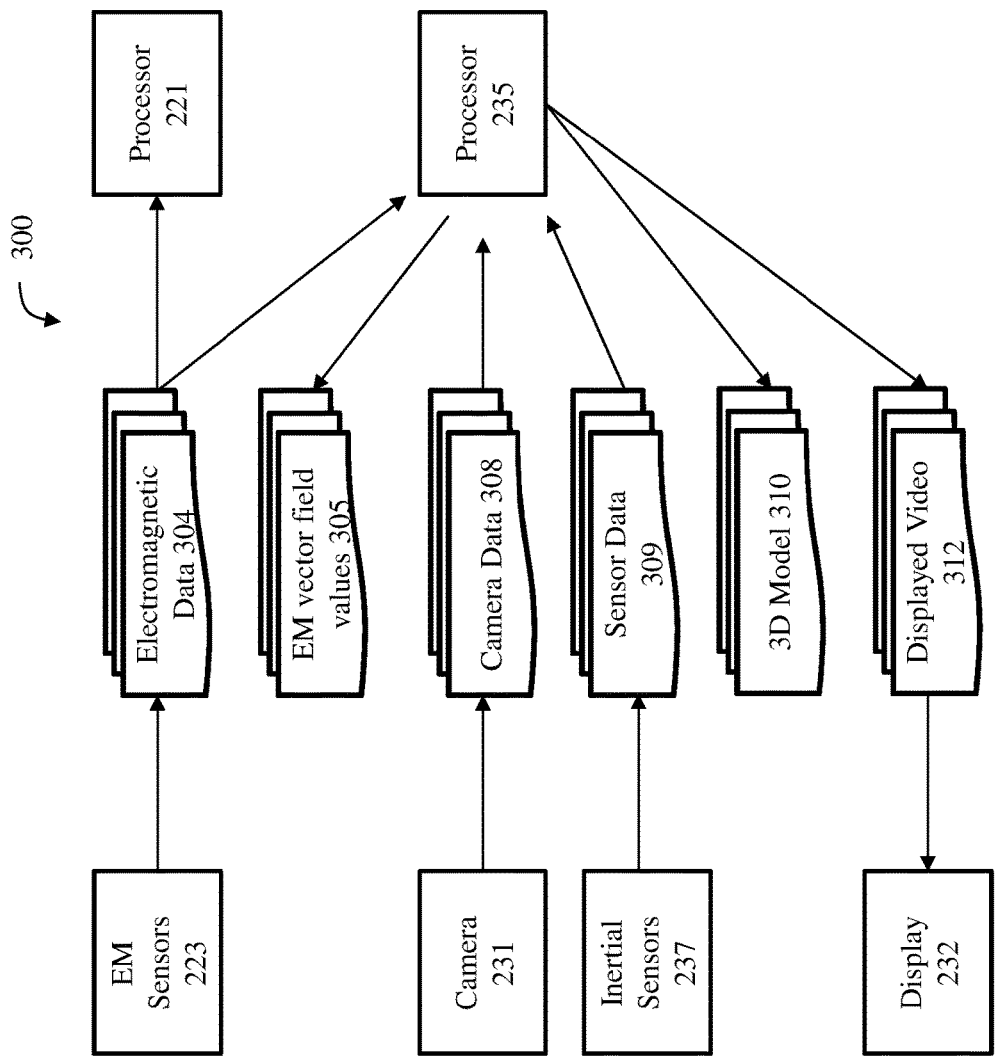
FIG. 3 is a diagram showing the data flow of the general process for visualizing buried assets during a buried asset locate procedure, according to an example embodiment.
Figure 4:
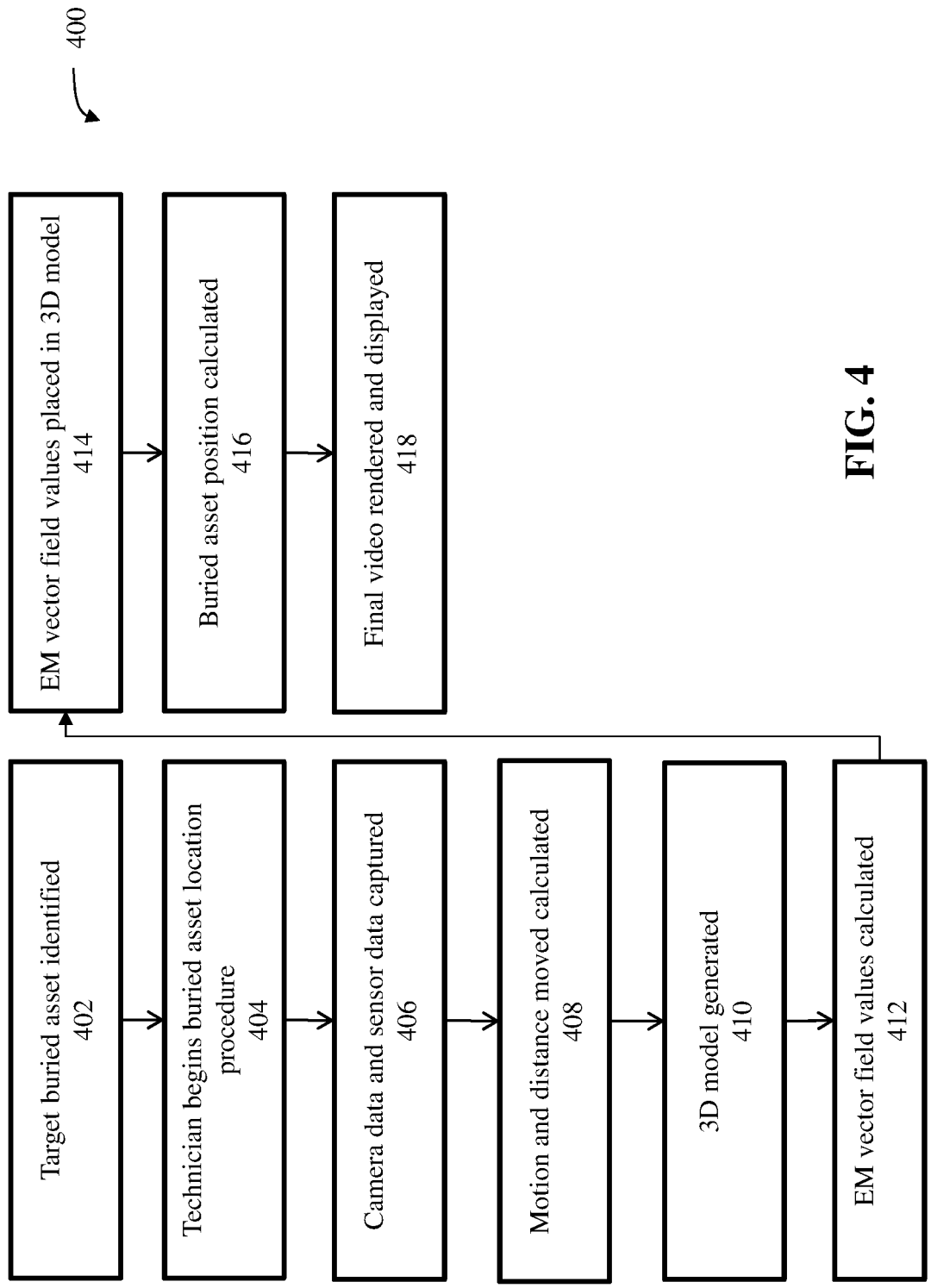
FIG. 4 is a flow chart showing the control flow of the process for visualizing buried assets during a buried asset locate procedure, according to an example embodiment.

FIG. 4 is a flow chart showing the control flow of the process 400 for visualizing buried assets during a buried asset locate procedure, according to an example embodiment. FIG. 4 is described with reference to FIG. 3, which is a diagram showing the data flow 300 of the general process for visualizing buried assets during a buried asset locate procedure, according to an example embodiment. Process 400 describes the steps that begin to occur when the locate technician 110 detects and identifies a particular target buried asset 130 that may be located within a physical geographical area or landscape 580. The process 400 is described with reference to FIG. 3, which shows the general data flow 300 of the process 400.

Process 400 starts in earnest with step 402 wherein a target buried asset 130, which is the buried asset the technician 110 is seeking, is identified to the technician 110. Step 402 may be performed while the technician 110 is located on site in the vicinity of the target buried asset, while the technician is at work or headquarters, while the technician is at home, on the road, or at any other location. In another embodiment, step 402 may be performed automatically when the technician 110 arrives at the vicinity of the target buried asset.

In step 404, the technician 110 performs a buried asset location procedure using his system 100, wherein sensors 223 read raw analog signals 140 emanating from the target buried asset 130 to generate electromagnetic data 204, and/or position data from the GNSS processor 222, buried asset data and/or buried asset data points, which may be stored locally or uploaded to a cloud storage location, such as server 102, database 104, via network 106. The electromagnetic data 204 may include current and depth measurements, as well as device gain and full-scale deflection data, and wherein said electromagnetic data is produced as a result of movement of the system 100 by the field technician 110 during performance of the buried asset location procedure. Electromagnetic data 204 may include electrical current measurement data, resistance measurement data, impedance measurement data, electrical signal magnitude measurement data, electrical signal frequency measurement data, electrical signal voltage measurement data, etc. The electromagnetic data 204 may also include signal strength, signal direction (left right of target), system gain control, phase (direction) of signal, measured depth, measured current, etc.

In step 406, the camera 231 captures camera data 308 of the surrounding landscape 580 and inertial sensors 237 capture sensor data 309, which is sent to the processor 235. In step 408, processor 235 calculates motion of the electromagnetic antennas 223 and distance moved by the electromagnetic antennas based on the sensor data 309 and the camera data 308. In step 410, processor 235 generates a 3D model 310 representing the electromagnetic antennas 223 and the target area in which the system 100 is situated, based on the camera data 308, and the motion and distance moved that was calculated based on the sensor data 309.

In step 412, the processor 235 calculates vector field values 305 for the EM field at multiple different points in space based on the electromagnetic data 305 from the electromagnetic antennas 223. In step 414, the processor 235 places each vector field value 305 that was calculated in the 3D model 310 representing the electromagnetic antennas and the target area in which the system is situated, based on the camera data 308, and the motion and distance moved that was calculated, thereby generating a 3D vector field representing the EM field emanating from the buried asset 130.

In step 416, the processor 235 calculates a position of the buried asset 130 based on the 3D vector field and the 3D model and creates an object in the 3D model that represents the position of the buried asset 130. In another embodiment, the processor 235 calculates calculating a position, depth and direction of the buried asset 130 based on the 3D vector field and the 3D model and creates an object in the 3D model that represents the position, depth and direction of the buried asset.

In step 418, the process 235 renders video of the physical landscape in the display 232, and overlays onto said video a graphic representation 570 of the buried asset 130 on said video, thereby generating the displayed video 312, which is displayed on display 232.

In a different embodiment, the 3D model 310 is a 2D model and the 3D vector field representing the EM field emanating from the buried asset 130 is a 2D vector field. In yet another embodiment, in step 406, the camera data 308, sensor data 309 and electromagnetic data 304 are transmitted by the system 100 to the server 102 via the network 106. In this embodiment, the server 102 performs the steps attributed to processor 235 in steps 408 through 418 above. Once the server 102 has completed the rendering of the video of the physical landscape in the display 232, and overlays onto said video a graphic representation 570 of the buried asset 130 on said video, server 102 transmits said rendered video to the system 100 via network 106, and subsequently the system 100 displays said video on the display 232.

Figure 5A:
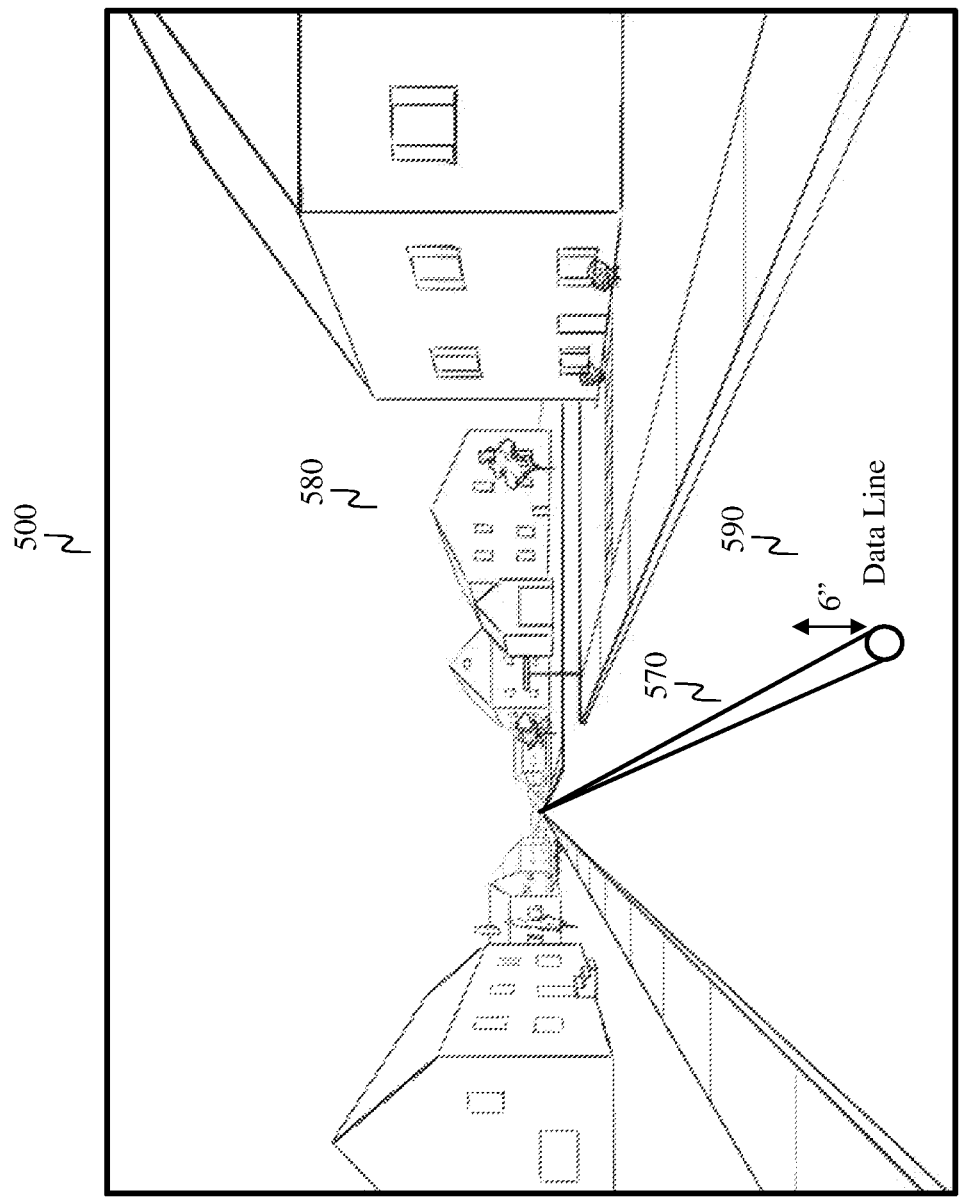
FIG. 5A is an illustration of a screenshot of a video display of the system for visualizing buried assets during a buried asset locate procedure, according to an example embodiment.

FIG. 5A is an illustration of a screenshot 500 of a video display of the system for visualizing buried assets during a buried asset locate procedure, according to an example embodiment. The screenshot 500 shows a video representation of the landscape 580 (which is the real-world place in which the system is located), as well as a graphical representation 570 of the buried asset 130 under the ground 150. The graphical representation may also include metadata 590 about the buried asset 130, such as the depth of the buried asset and the type of the buried asset. FIG. 5A shows that the graphical representation 570 of the buried asset 130 is a 3D model of the buried asset shown in its actual global location under the ground about six inches.

Figure 5B:
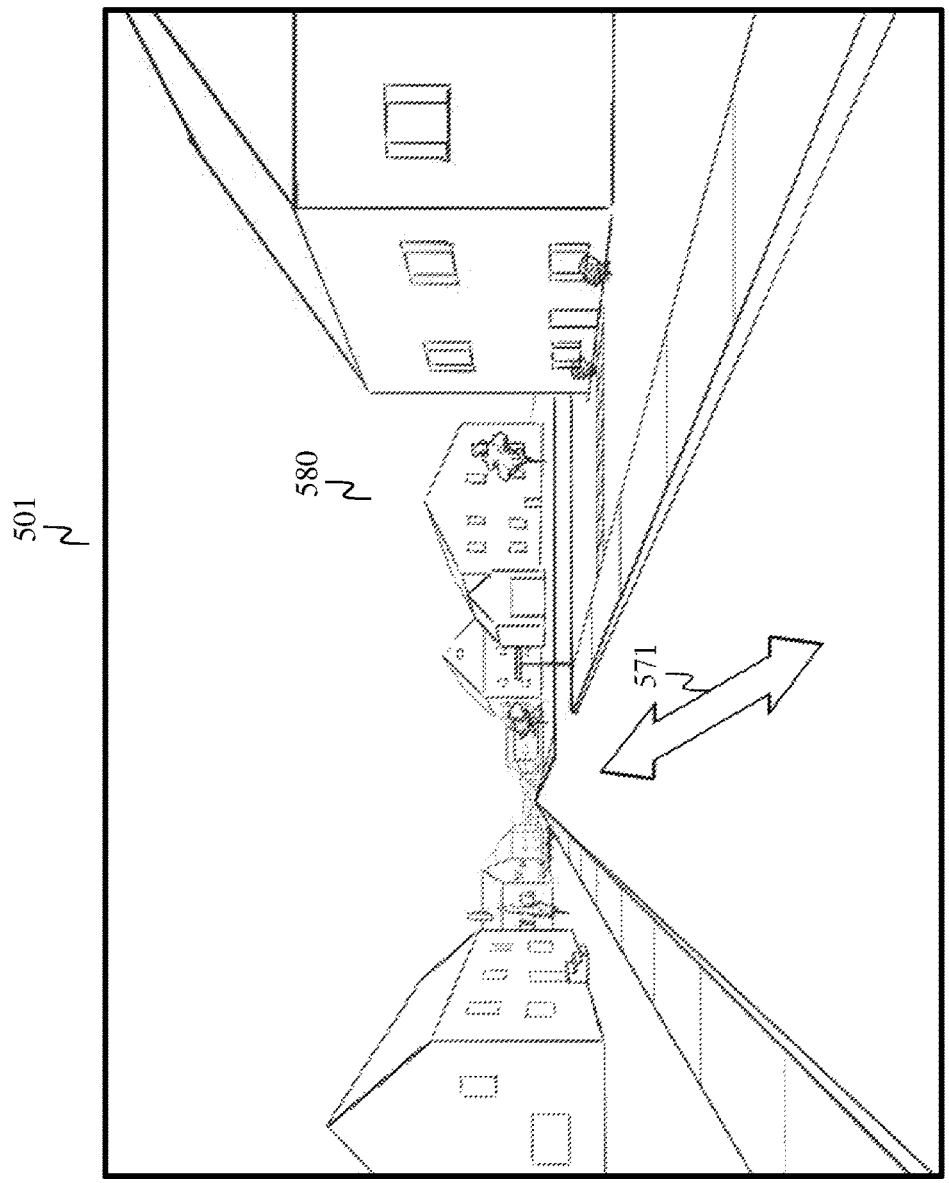
FIG. 5B is another illustration of a screenshot of a different video display of the system for visualizing buried assets during a buried asset locate procedure, according to an example embodiment

FIG. 5B is another illustration of a screenshot 501 of a video display of the system for visualizing buried assets during a buried asset locate procedure, according to an example embodiment. The screenshot 501 shows a video representation of the landscape 580, as well as a graphical representation 571 of the buried asset 130 under the ground 150. FIG. 5B shows that the graphical representation 571 of the buried asset 130 is a 2D graphic placed on top of the ground surface above the actual global location of the buried asset 130 underground. Graphical representation 571 may be shown as a paint or color-coded marker on the ground surface over the position of the buried asset 130 under the ground 150. The shape of the graphical representation 571 may indicate the type of the buried asset 130.

FIG. 5C is an illustration of a closeup of a video display of the system for visualizing buried assets during a buried asset locate procedure, according to an example embodiment. FIG. 5C shows the system 100 being utilized in a buried asset locate procedure in the physical landscape 580. The system 100 includes a display 232 (or screen) that is displaying the screenshot 500 described above with reference to FIG. 5A. The screenshot 500 shows a video representation of the landscape 580, as well as a graphical representation 570 of the buried asset 130 under the ground 150.

FIG. 5B shows that the display 232 displays an interactive experience of the real-world environment where the landscape that resides in the real-world is augmented by computer-generated perceptual information, such as overlaid visual data representing the buried asset 130. The overlaid visual data comprises graphics 570, 590 that represent buried assets in such a way that the visual data is seamlessly interwoven with video of the actual ground in the physical world. In this way, the system 100 alters the technician's ongoing perception of the actual ground 150, such that he can also perceive the location and orientation of buried assets under the ground 150. This aids the technician 110 in detecting said buried asset and marking it above ground using his paint marker.

Figure 6:
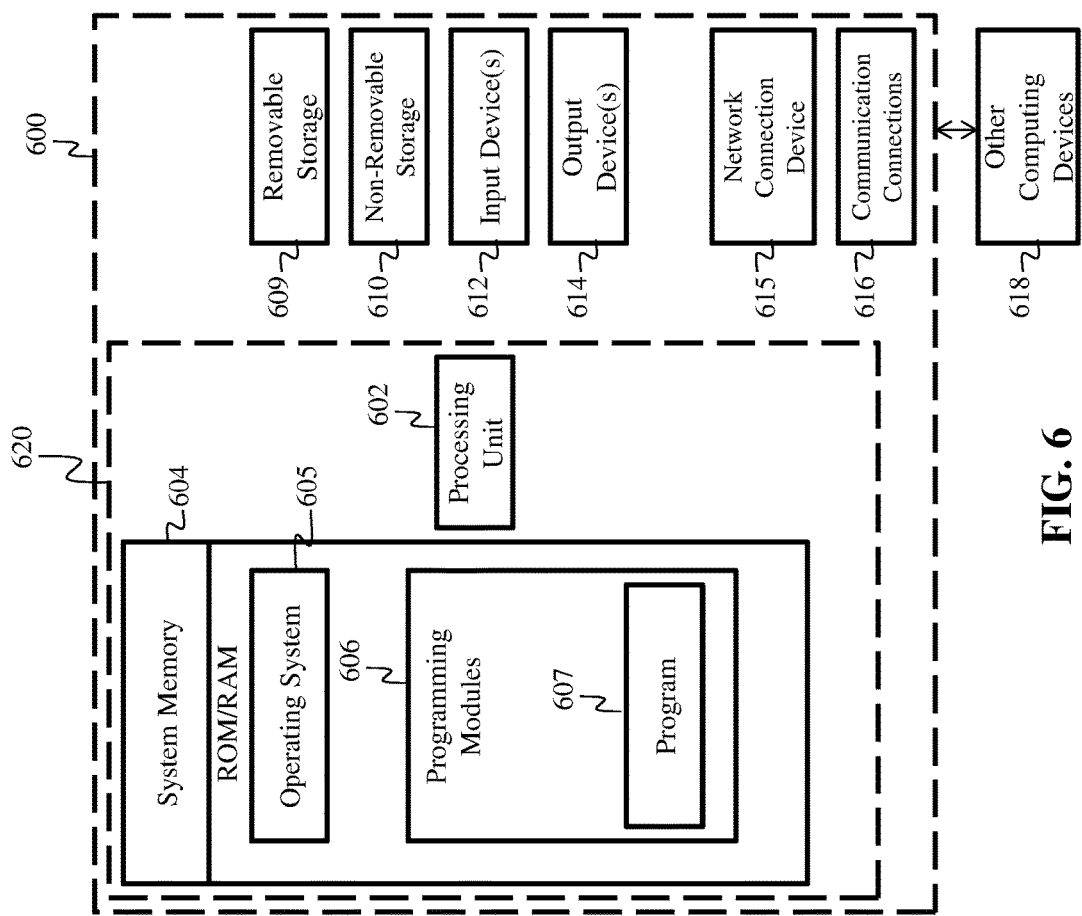
FIG. 6 is a block diagram of a system including a computing device, according to an example embodiment.

FIG. 6 is a block diagram of a system including an example computing device 600 and other computing devices. Consistent with the embodiments described herein, the aforementioned actions performed by system 100 and/or ELD 202 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for system 100 and process 400, as described above. Process 400 may operate in other environments and are not limited to computing device 600.

With reference to FIG. 6, a system consistent with an embodiment may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random-access memory (RAM)), non-volatile (e.g. read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of system 100 and/or ELD 202. Furthermore, embodiments may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. Computing device 600 may also include a vibration device capable of initiating a vibration in the device on command, such as a mechanical vibrator or a vibrating alert motor. The aforementioned devices are only examples, and other devices may be added or substituted.

Computing device 600 may also contain a network connection device 615 that may allow device 600 to communicate with other computing devices 618, such as over a network in a distributed computing environment, for example, an intranet or the Internet. Device 615 may be a wired or wireless network interface controller, a network interface card, a network interface device, a network adapter or a LAN adapter. Device 615 allows for a communication connection 616 for communicating with other computing devices 618. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. program module 607) may perform processes including, for example, one or more of the stages of the process 400 as described above. The aforementioned processes are examples, and processing unit 602 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including hand-held devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general-purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for calculating and visualizing a position of a buried asset during a location procedure in a target area, the system comprising:
   1) an electromagnetic locate device (ELD) including one or more electromagnetic antennas configured for sensing an electromagnetic (EM) field emanating from the buried asset at a target area, wherein each electromagnetic antenna produces a vector field data at each periodic point in space; and
   2) an augmented reality system comprising a camera, a display, inertial sensors for measuring motion and distance moved, and one or more processors configured for:
      a) reading camera data from the camera of a target area in which the system is situated, and reading sensor data from the inertial sensors;
      b) calculating motion of the electromagnetic antennas and distance moved by the electromagnetic antennas based on the sensor data and the camera data;
      c) generating a 3D model representing the electromagnetic antennas and the target area in which the system is situated, based on the camera data, and the motion and distance moved that was calculated;
      d) calculating vector field values for the EM field at multiple different points in space based on the vector field data from the electromagnetic antennas;
      e) placing each vector field value that was calculated in the 3D model representing the electromagnetic antennas and the target area in which the system is situated, based on the camera data, and the motion and distance moved that was calculated, thereby generating a 3D vector field representing the EM field emanating from the buried asset;
      f) calculating a position of the buried asset based on the 3D vector field and the 3D model, and creating an object in the 3D model that represents the position of the buried asset; and
      g) rendering video of the target area in the display, and overlaying onto said video a graphic representation of the position of the buried asset, based on the 3D model.

2. The system of claim 1, wherein the camera data comprises video data.

3. The system of claim 1, wherein the camera data comprises still image data.

4. The system of claim 1, wherein the 3D vector field and the 3D model are transmitted via a wireless communications network to a cloud storage location.

5. The system of claim 1, wherein the ELD further comprises a GNSS processor for calculating a current global position of the system.

6. The system of claim 1, wherein the step of calculating motion of the electromagnetic antennas and distance moved by the electromagnetic antennas further comprises calculating orientation of the electromagnetic antennas and height of the electromagnetic antennas from a ground surface from the inertial sensors.

7. The system of claim 6, wherein the step of generating a 3D model further comprises generating a 3D model representing the electromagnetic antennas and the target area in which the system is situated, further based on the motion of the electromagnetic antennas and distance moved by the electromagnetic antennas that was calculated.

8. The system of claim 1, wherein the step of creating an object in the 3D model that represents the position of the buried asset further comprises creating a flat 2D object in the 3D model that represents the position of the buried asset.

9. The system of claim 1, wherein the step of calculating the position of the buried asset based on the 3D vector field and the 3D model further comprises calculating the position, depth and direction of the buried asset based on the 3D vector field and the 3D model and creating an object in the 3D model that represents the position, depth and direction of the buried asset.

10. The system of claim 1, wherein the step of rendering video of the target area further comprises rendering video of the target area in the display, and overlaying onto said video a graphic representation of the position, depth and direction of the buried asset, based on the 3D model.

11. A system for calculating and visualizing a position of a buried asset during a location procedure in a target area, the system comprising:
1) an electromagnetic locate device (ELD) including one or more electromagnetic antennas configured for sensing an electromagnetic (EM) field emanating from the buried asset at a target area, wherein each electromagnetic antenna produces a vector field data at each periodic point in space; and
2) an augmented reality system comprising a camera, a display, inertial sensors for measuring motion and distance moved, and one or more processors configured for:
a) reading camera data from the camera of a target area in which the system is situated, and reading sensor data from the inertial sensors;
b) calculating motion of the electromagnetic antennas and distance moved by the electromagnetic antennas based on the sensor data and the camera data;
c) generating a 2D model representing the electromagnetic antennas and the target area in which the system is situated, based on the camera data, and the motion and distance moved that was calculated;
d) calculating vector field values for the EM field at multiple different points in space based on the vector field data from the electromagnetic antennas;
e) placing each vector field value that was calculated in the 2D model representing the electromagnetic antennas and the target area in which the system is situated, based on the camera data, and the motion and distance moved that was calculated, thereby generating a 2D vector field representing the electromagnetic field emanating from the buried asset;
f) calculating a position of the buried asset based on the 2D vector field and the 2D model, and creating an object in the 2D model that represents the position of the buried asset; and
g) rendering video of the target area in the display, and overlaying onto said video a graphic representation of the position of the buried asset, based on the 2D model.

12. The system of claim 11, wherein the camera data comprises video data.

13. The system of claim 11, wherein the camera data comprises still image data.

14. The system of claim 11, wherein the 2D vector field and the 2D model are transmitted via a wireless communications network to a cloud storage location.

15. The system of claim 11, wherein the ELD further comprises a GNSS processor for calculating a current global position of the system.

16. The system of claim 11, wherein the step of calculating motion of the electromagnetic antennas and distance moved by the electromagnetic antennas based on the sensor data and the camera data further comprises calculating orientation of the electromagnetic antennas and height of the electromagnetic antennas from a ground surface from the inertial sensors.

17. The system of claim 11, wherein the step of generating a 2D model further comprises generating a 2D model representing the electromagnetic antennas and the target area in which the system is situated, further based on motion of the electromagnetic antennas and distance moved by the electromagnetic antennas that was calculated.

18. A method for calculating and visualizing a position of a buried asset during a location procedure in a target area, the method comprising:
a) sensing an electromagnetic (EM) field emanating from the buried asset at a target area, using electromagnetic antennas, wherein each electromagnetic antenna produces vector field data at each periodic point in space; and
b) reading camera data from a camera of a target area, and reading sensor data from inertial sensors;
c) calculating motion of the electromagnetic antennas and distance moved by the electromagnetic antennas based on the sensor data and the camera data;
d) generating a 3D model representing the electromagnetic antennas and the target area, based on the camera data, and the motion and distance moved that was calculated;
e) calculating vector field values for the EM field at multiple different points in space based on the vector field data from the electromagnetic antennas;
f) placing each vector field value that was calculated in the 3D model representing the electromagnetic antennas and the target area, based on the camera data, and the motion and distance moved that was calculated, thereby generating a 3D vector field representing the EM field emanating from the buried asset;
g) calculating a position of the buried asset based on the 3D vector field and the 3D model, and creating an object in the 3D model that represents the position of the buried asset; and
h) rendering video of the target area, and overlaying onto said video a graphic representation of the position of the buried asset, based on the 3D model.

19. The method of claim 18, wherein the camera data comprises video data.

20. The method of claim 18, wherein the camera data comprises still image data.

21. A system for calculating and visualizing a position of a buried asset during a location procedure in a target area, the system comprising:
1) an electromagnetic locate device (ELD) including one or more electromagnetic antennas configured for sensing an electromagnetic (EM) field emanating from the buried asset at a target area, wherein each electromagnetic antenna produces a vector field data at each periodic point in space; and
2) an augmented reality system comprising a camera, a display, inertial sensors for measuring motion and distance moved, and one or more processors configured for reading camera data from the camera of a target area in which the system is situated, reading sensor data from the inertial sensors, and transmitting the camera data and sensor data via a wireless communications network to a cloud storage location;
3) a remote server including a processor configured for:
a) calculating motion of the electromagnetic antennas and distance moved by the electromagnetic antennas based on the sensor data and the camera data that was received via the wireless communications network;
b) generating a 3D model representing the electromagnetic antennas and the target area in which the system is situated, based on the camera data, and the motion and distance moved that was calculated;
c) calculating vector field values for the EM field at multiple different points in space based on the vector field data from the electromagnetic antennas;

d) placing each vector field value that was calculated in the 3D model representing the electromagnetic antennas and the target area in which the system is situated, based on the camera data, and the motion and distance moved that was calculated, thereby generating a 3D vector field representing the EM field emanating from the buried asset;

e) calculating a position of the buried asset based on the 3D vector field and the 3D model, and creating an object in the 3D model that represents the position of the buried asset;

f) rendering video of the target area in the display, and overlaying onto said video a graphic representation of the position of the buried asset, based on the 3D model; and g) transmitting the video that was rendered to the augmented reality system via the wireless communications network.

22. The system of claim 21, wherein the processor of the augmented reality system is further configured for receiving the video that was rendered via the wireless communications network and displaying said video in the display.

\* \* \* \* \*